United States Patent [19]

Liu

[11] Patent Number: 5,759,092
[45] Date of Patent: Jun. 2, 1998

[54] APPARATUS FOR SHARPENING CIRCULAR SAW TEETH

[76] Inventor: Wayne Liu, No. 2, Lane 12, Chung-San St., Hsi-Chih Chen, Taipei Hsien, Taiwan

[21] Appl. No.: 784,142

[22] Filed: Jan. 17, 1997

[51] Int. Cl.[6] ................................................. B24B 3/46
[52] U.S. Cl. .................... 451/125; 451/403; 76/77; 76/48; 76/42
[58] Field of Search .................... 451/124, 125, 451/403, 23, 13; 76/112, 77, 48, 42, 40

[56] References Cited

U.S. PATENT DOCUMENTS

| 315,175 | 4/1885 | Bush, Jr. | 76/77 |
| 755,319 | 3/1904 | Schofield | 76/77 |
| 881,231 | 3/1908 | Filstrup | 76/77 |
| 2,885,912 | 5/1959 | Alber | 76/112 |
| 4,040,313 | 8/1977 | Lustgraaf | 76/37 |
| 5,257,563 | 11/1993 | Hutchinson | 76/77 |

FOREIGN PATENT DOCUMENTS 0074517  4/1988  Japan ................................. 76/48

*Primary Examiner*—Robert A. Rose
*Attorney, Agent, or Firm*—Weingarten, Schurgin, Gagnebin & Hayes LLP

[57] ABSTRACT

An apparatus for sharpening the teeth of a circular saw comprises a rocking arm with a pawl to engage and actuate the teeth of an indexing ratchet wheel which is mounted coaxially with the circular saw for synchronous clockwise indexing, and a grinding wheel capable of intermittently moving forward to contact and grind the saw teeth. A cam mechanism controls the rocking arm so that the land of each saw tooth first contacts the grinding wheel when the grinding wheel moves forward, prior to the contacting of the root and the cutting edge thereof with the grinding wheel when the grinding wheel is about to reach its frontmost position. The saw tooth starts to stop temporarily for a short time when the grinding wheel is about to contact the root and the cutting edge. The problems of damages caused by impacts and/or excessive contact pressure are therefore alleviated.

4 Claims, 8 Drawing Sheets

APPARATUS FOR SHARPENING CIRCULAR SAW TEETH

BACKGROUND OF THE INVENTION

1. Field of the Invention

This invention relates to an apparatus for sharpening circular saw teeth, and particularly to an apparatus having a ratchet wheel to be mounted coaxially with a circular saw blade for clockwise indexing each saw tooth during a grinding operation with a grinding wheel which reciprocates forwards and backwards.

2. Description of the Related Prior Art

Conventional grinding apparatuses of the above-described type generally comprise a rocking arm that turns to and fro within a limited angle to reciprocate a push arm so that the push arm moves the teeth of a ratchet wheel successively and indexes the teeth of a circular saw blade relative to a reciprocating grinding wheel. FIG. 1 shows a conventional push arm 1 which has a slanted tip portion 2 to push the teeth of a ratchet wheel 3 which is used to index the teeth of a circular saw blade mounted coaxially therewith for simultaneous rotation. Referring to FIGS. 2A–2E in combination with FIG. 1, a grinding wheel 5 is shown to move forward and backward when the circular saw blade turns counterclockwise. In particular, when the push arm 1 pushes one of the ratchet teeth to turn counterclockwise, each saw tooth is turned synchronously counterclockwise by a predetermined angle corresponding to the forward or backward movement of the grinding wheel 5.

When the grinding wheel moves toward the circular saw teeth, it first contacts and grinds the cutting edge 6 of a tooth as shown in FIG. 2B. When the grinding wheel moves backward, it moves from the root 7 of the tooth to the land 8 of a next saw tooth, as shown in FIGS. 2C and 2D, as the saw teeth moves counterclockwise. In this grinding operation, the grinding wheel contacts the cutting edge in its forward moving mode and the cutting edge is moved away from the grinding wheel when the circular saw blade is turned counterclockwise. Generally, it is difficult to adjust accurately the cutting edge at an appropriate position so that the grinding wheel exactly contacts the cutting edge without excessive pressure. If the cutting edge is overly adjusted, the left side of the grinding wheel goes beyond the location of the cutting edge so that the cutting edge is abraded excessively, and a portion thereof can undesirably be scraped out. If the adjustment is insufficient, the cutting edge does not contacts the grinding wheel, and the cutting edge can never be ground because it subsequently moves away from the grinding wheel due to the counterclockwise rotation of the circular saw blade.

On the other hand, since the cutting edge first contacts the forceful forward grinding face of the grinding wheel during the forward stroke of the grinding wheel, impacts are produced upon contact, thus running the risk of damaging or deforming the cutting edge and the grinding wheel. Since the deformation of the grinding wheel may impair the cutting edge, frequent dressing of the grinding wheel is required.

Overheating is another problem that results from the excessive contact pressure produced between the grinding wheel and each saw tooth during the full stroke forward movement of the grinding wheel. Due to overheating, annealing can occur in the saw teeth to a certain depth from the surface thereof, thus turning the saw teeth to a dark blue color. Within this certain depth, since the hardness of the saw teeth is reduced, the saw teeth tend to be dull easily. In order to solve this problem, it has been a common practice to re-grind the saw teeth carefully and slowly to remove out the annealed portion little by little and to produce new cutting edges or tips. This task requires considerable time and thus adversely affects the efficiency of the apparatus.

SUMMARY OF THE INVENTION

It is an object of the invention to provide an apparatus for sharpening the teeth of a circular saw blade which alleviates the above-described problems of the conventional apparatus.

It is a second object of the invention to provide an apparatus for sharpening the teeth of a circular saw blade with an improved moving mechanism to control the rotation of the indexing ratchet wheel and the circular saw so that the cutting edge of the saw teeth does not contact the forceful forward end of the forwardly moving grinding wheel, thereby eliminating the risk of inducing impacts which would damage the cutting edge and the grinding face of the grinding wheel.

It is a third object of the invention to provide an apparatus for sharpening a circular saw blade with an improved moving mechanism whereby the cutting edge of each saw tooth moves in a direction toward and contacts the flat end faces or side grinding faces of a grinding wheel, which have less grinding forces than that of the forceful forwarding circumferential grinding face.

It is a fourth object of the invention to provide an apparatus for sharpening a circular saw blade with an improved moving mechanism whereby the grinding wheel gradually moves forward to the root of a saw tooth from its land and grinds the cutting edge and the root at the instant of stopping the circular saw blade and then subsequently moves backward to leave the saw tooth while the saw blade is kept still.

It is a fifth object of the invention to provide an apparatus for sharpening a circular saw blade whereby the grinding wheel starts to contact the land of each saw tooth thereby providing a reference point based on the initial contact point for adjustment of the position of the grinding wheel relative to the saw teeth.

The invention provide an apparatus for sharpening the teeth of a circular saw, includes a machine body, a grinding wheel which is movably and adjustably mounted on the machine body and which is capable of moving forward to contact each saw tooth and backward to depart from each saw tooth, a saw blade support to hold coaxially an indexing ratchet wheel with the circular saw for synchronous rotation. The indexing ratchet wheel is capable of moving and indexing each saw tooth relative to the grinding wheel. There are first means for moving and controlling the grinding wheel, and second means for moving and controlling the indexing ratchet wheel. According to one aspect of the invention, the second means comprises a cam mechanism, a rocking arm actuated by the cam mechanism, and a pull arm connected to the rocking arm for moving forward and backward so as to turn the ratchet teeth of the indexing ratchet wheel as well as the saw teeth of the circular saw. The cam mechanism controls the rocking arm and the pull arm so as to move the circular saw to start contacting the grinding wheel with the land of each saw tooth thereof when the grinding wheel moves forward and to temporarily stop the circular saw when the grinding wheel contacts the cutting edge and the root of each saw tooth thereof until the grinding wheel leaves the circular saw. Advantageously, the pull arm is provided with a hook-like pawl for engaging each ratchet tooth.

According to another aspect of the invention, the cam mechanism controls the rocking arm and the pull arm to cause the cutting edge of each saw tooth of the circular saw to contact the grinding wheel when the grinding wheel is about to reach its frontmost position, whereby the cutting edge is subjected to grinding during the last thousandth of inches of the forward stroke of the grinding wheel. The duration of grinding the cutting edge is reduced, thus eliminating the overheating problem.

The present exemplary preferred embodiment will be described in detail with reference to the accompanying drawings.

DETAILED DESCRIPTION OF THE PREFERRED EMBODIMENT

Figure 1:
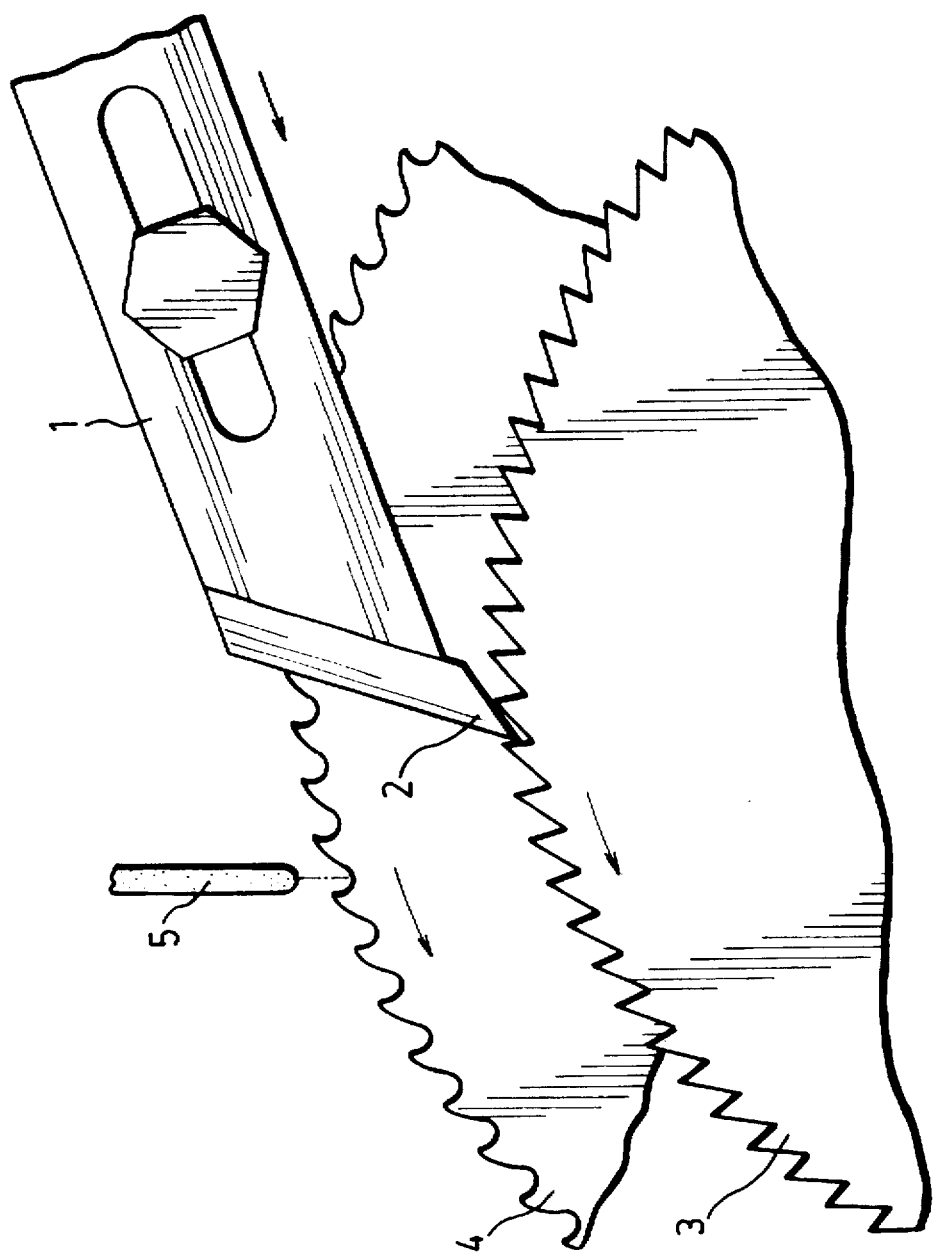
FIGS. 1 and 2A–2E show portions of the conventional saw tooth sharpening apparatus.
Figure 2A:
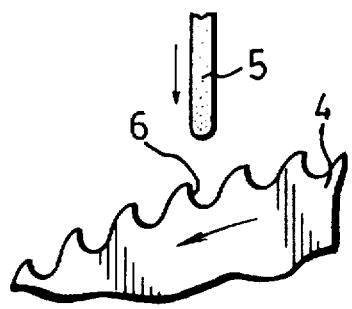
Figure 2B:
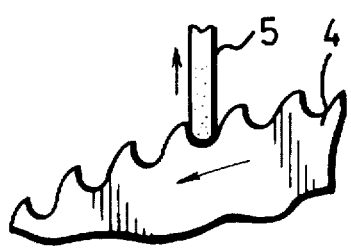
Figure 2C:
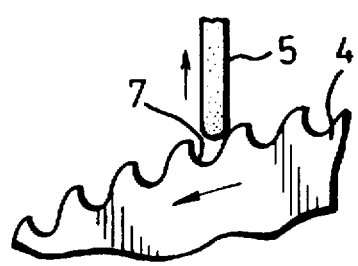
Figure 2D:
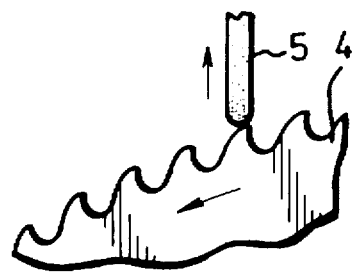
Figure 2E:
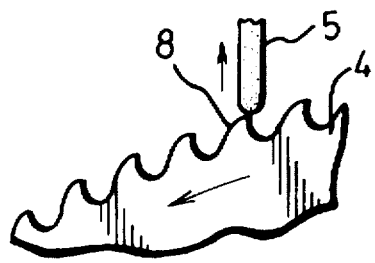
Figure 3:
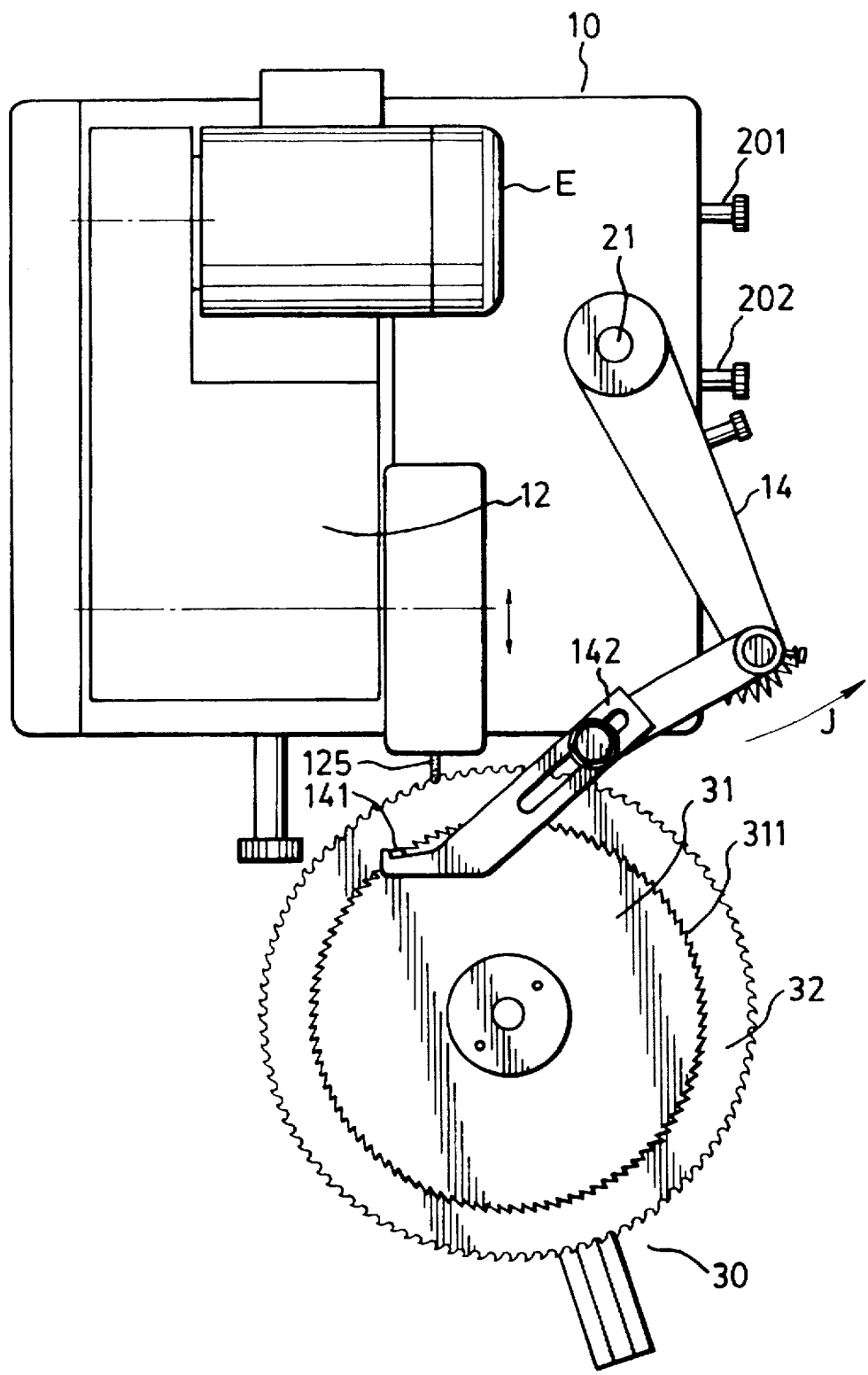
FIG. 3 shows a schematic top view of a saw tooth sharpening apparatus according to the present invention.
Figure 4:
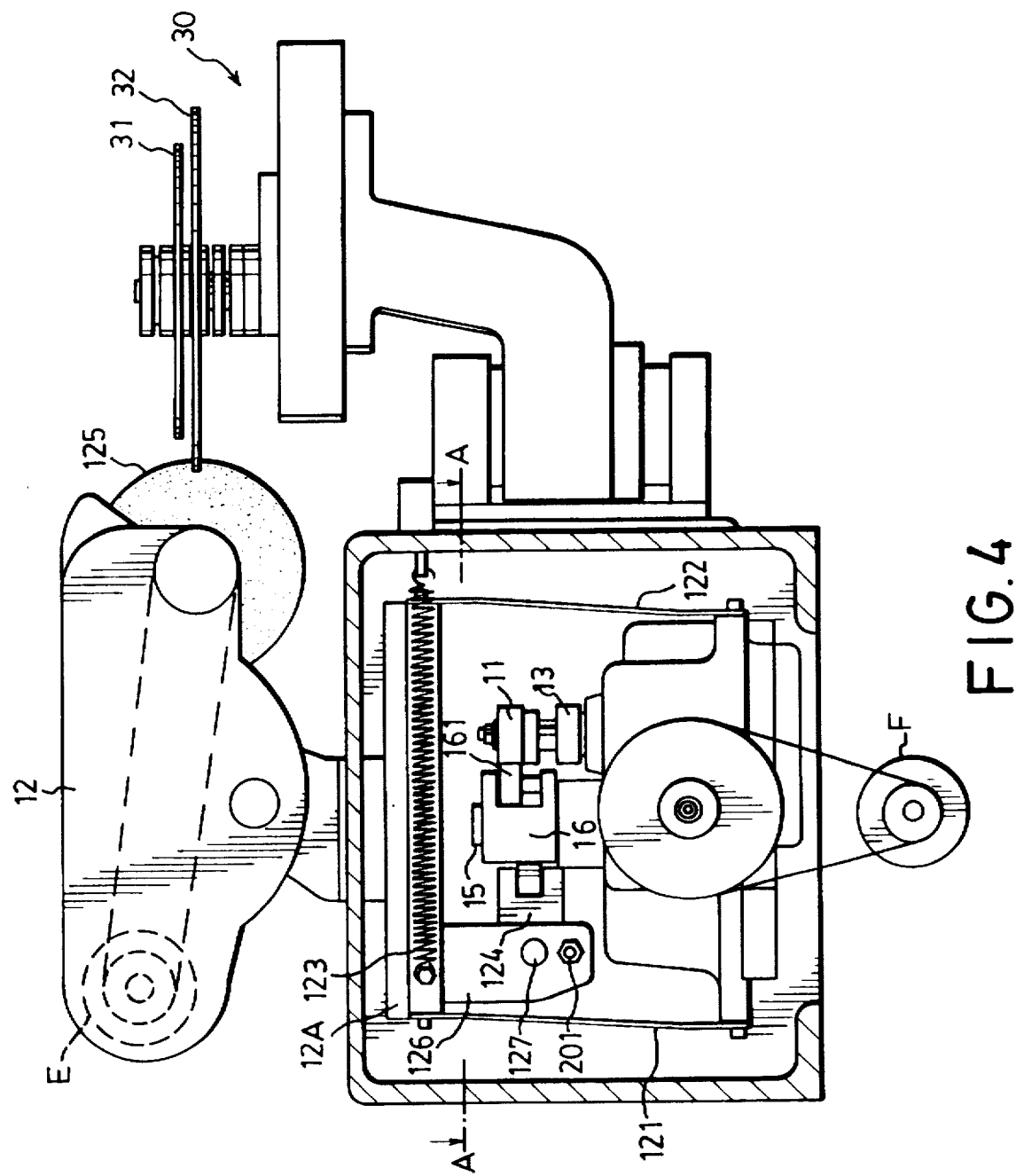
FIG. 4 shows a schematic side view of the apparatus of FIG. 3.
Figure 5:
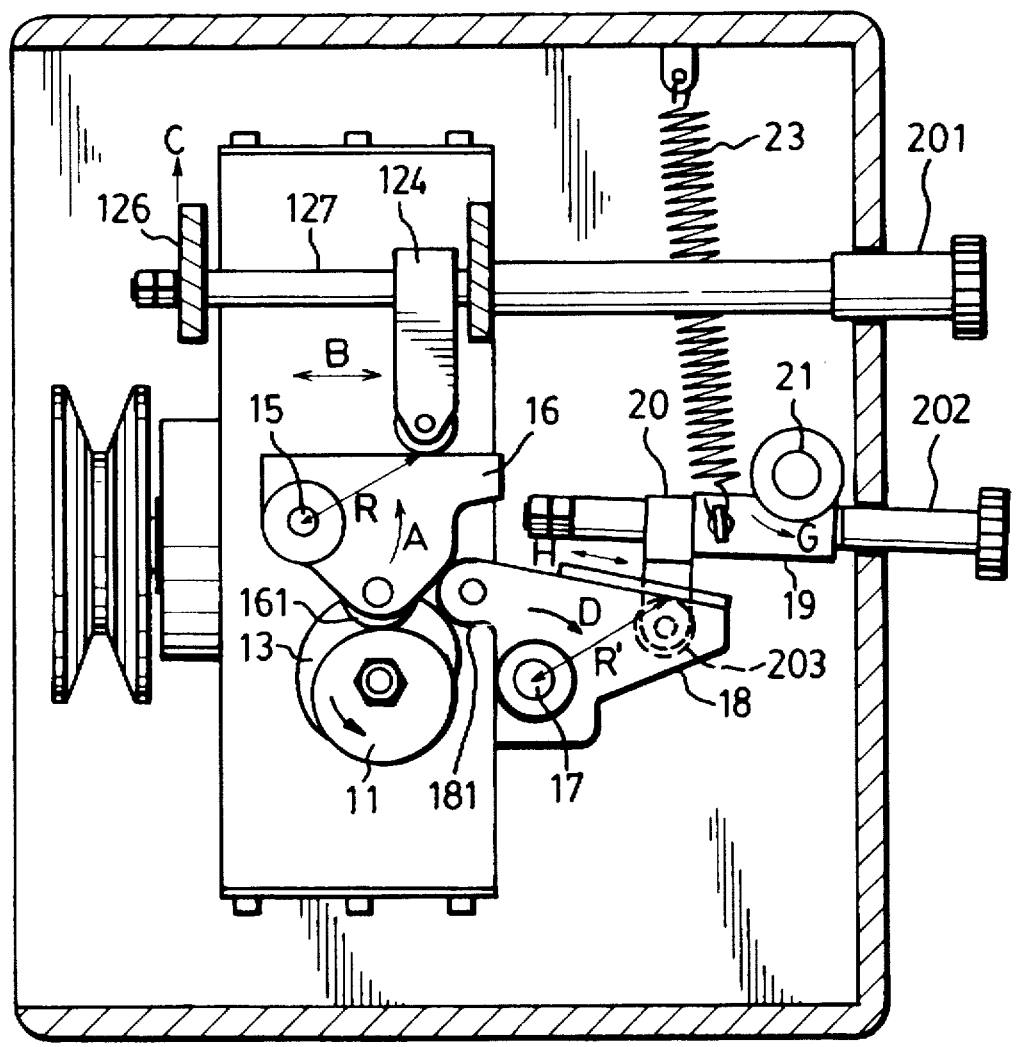
FIG. 5 is a schematic sectional view taken along line A—A of FIG. 4.

Referring to FIGS. 3 to 5, the apparatus of the preferred embodiment is shown to comprise a machine body 10, and a saw blade support 30 adjacent to the machine body 10. The saw blade support 30 is conventional and is adapted to hold a circular saw blade 32 coaxially with an indexing ratchet wheel 31 for synchronous rotation. However, unlike the conventional ratchet wheel, the ratchet teeth 311 of the indexing ratchet wheel 31 incline in a counterclockwise direction.

A grinding wheel 125 is mounted in a conventional manner on a grinding wheel support 12 which holds a grinding wheel driving motor E, and the support 12 is mounted on the machine body 10 in a conventional manner. The grinding wheel 125 is reciprocated via a cam mechanism which includes cams 11 and 13 which are operated by a motor F. The cam 13 is mounted coaxially with the cam 11 for synchronous rotation to actuate a reciprocating mechanism of a rocking arm 14 which will be described hereinunder.

The cam 11 is arranged to contact a roller 161 of a rocking block 16, which is turnable about a pivot shaft 15, so as to actuate the rocking block 16. The rocking block 16 is pushed intermittently in a direction shown by an arrow A when the cam 11 is rotated by the motor F. The rocking block 16 in turn actuates an adjustable link 124 which is mounted on a support shaft 127 which in turn is secured to a support 126. The support 126 is mounted to a base 12A of a grinding wheel support 12, and the base 12A is connected to upper ends of spring plates 121 and 122. The other ends of the spring plates 121 and 122 are mounted on the machine body.

Spring 123 is provided to keep the rocking block 16 in contact with the cam 11 and to keep the adjustable link 124 in contact with the rocking block 16. As the support 126 moves backward (as shown by arrow C), the grinding wheel support 12 is moved backward along with the support 126 so that the grinding wheel 125 is moved away from each saw tooth. The grinding wheel support 12 is therefore reciprocated by the actuation of the cam 11 and the action of the springs 121, 122, 123. The stroke of the reciprocating movement of the grinding wheel 125 can be adjusted by means of an adjusting screw 201.

Figure 6:
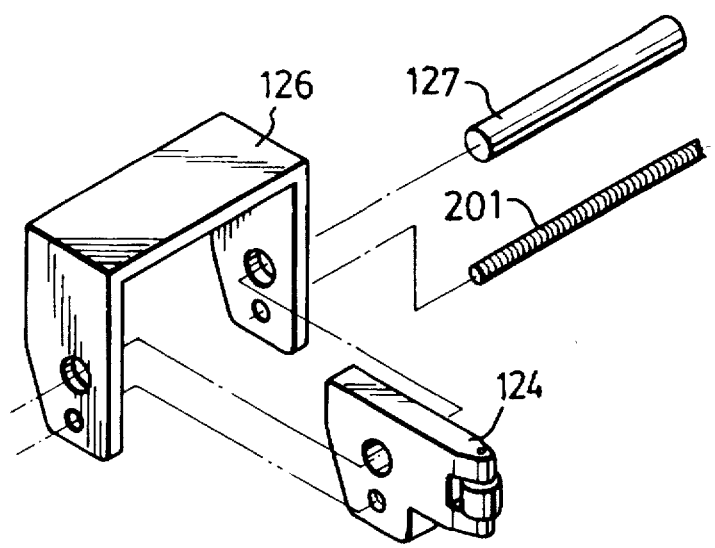
FIG. 6 shows a portion of the apparatus included in an actuation mechanism for moving and controlling a grinding wheel.

Referring to FIG. 6 in combination with FIG. 5, the adjusting screw 201 is shown to pass through the adjustable link 124. When the adjusting screw 201 is turned, the link 124 can be moved in a direction shown by arrow B. As such, the contact point between the rocking block 16 and the link 124 can be adjusted for regulating the length of the radius R, or the stroke of the reciprocating movement of the block 16 or the link 124. Accordingly, the stroke of the grinding wheel 125 can be adjusted. The grinding wheel 125 is moved forward to contact the saw teeth by the action of the spring 123.

Figure 7:
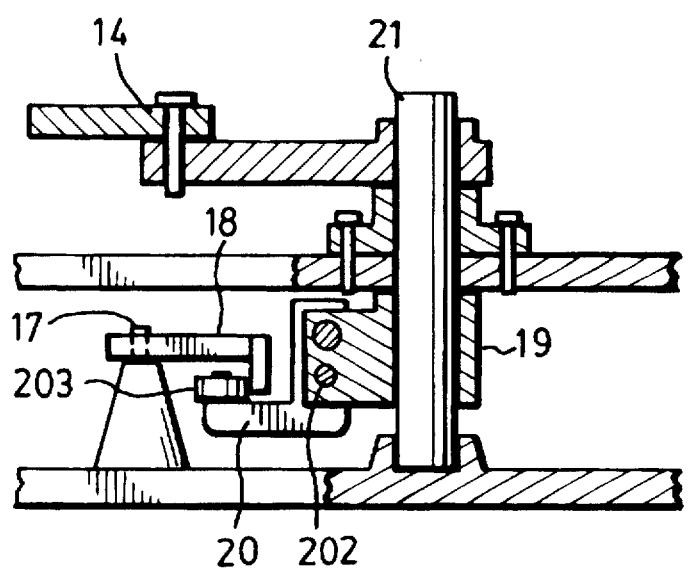
FIG. 7 shows a portion of the apparatus included in an actuation mechanism for moving and controlling a rocking arm used to drive an indexing ratchet wheel.

The cam 13 which is used to actuate the rocking arm 14 as hereinbefore described is arranged to be in contact with a cam follower 181 of a rocking block 18 which is turnable about a pivot shaft 17 as best shown in FIGS. 5 and 7. The rocking block 18 is in turn placed in contact with a roller 203 of an adjustable link 20 which is coupled with another rocking block 19 turnable about a pivot shaft 21. The rocking arm 14 is mounted coaxially with the rocking block 19 on the pivot shaft 21 for simultaneous turning movement. When the rocking block 18 is pushed by the cam 13 in a direction shown by arrow D, the rocking block 19 is turned in a direction shown by arrow G. As a result, the rocking arm 14 is moved backward in a direction shown by arrow J (FIG. 3). A spring 23 is provided to reverse the direction of the rocking block 19, thereby reciprocating the rocking arm 14.

An adjusting screw 202 passes through the adjustable link 20 so that the position of the link 20 can be regulated via a displacement shown by arrow H and that the length of the radius R' (the distance of the contact point between the roller 203 and the rocking block 18 from the pivot shaft 17) can be adjusted or the stroke of the reciprocation of the rocking block 19 or the rocking arm 14 can be adjusted.

Figure 8:
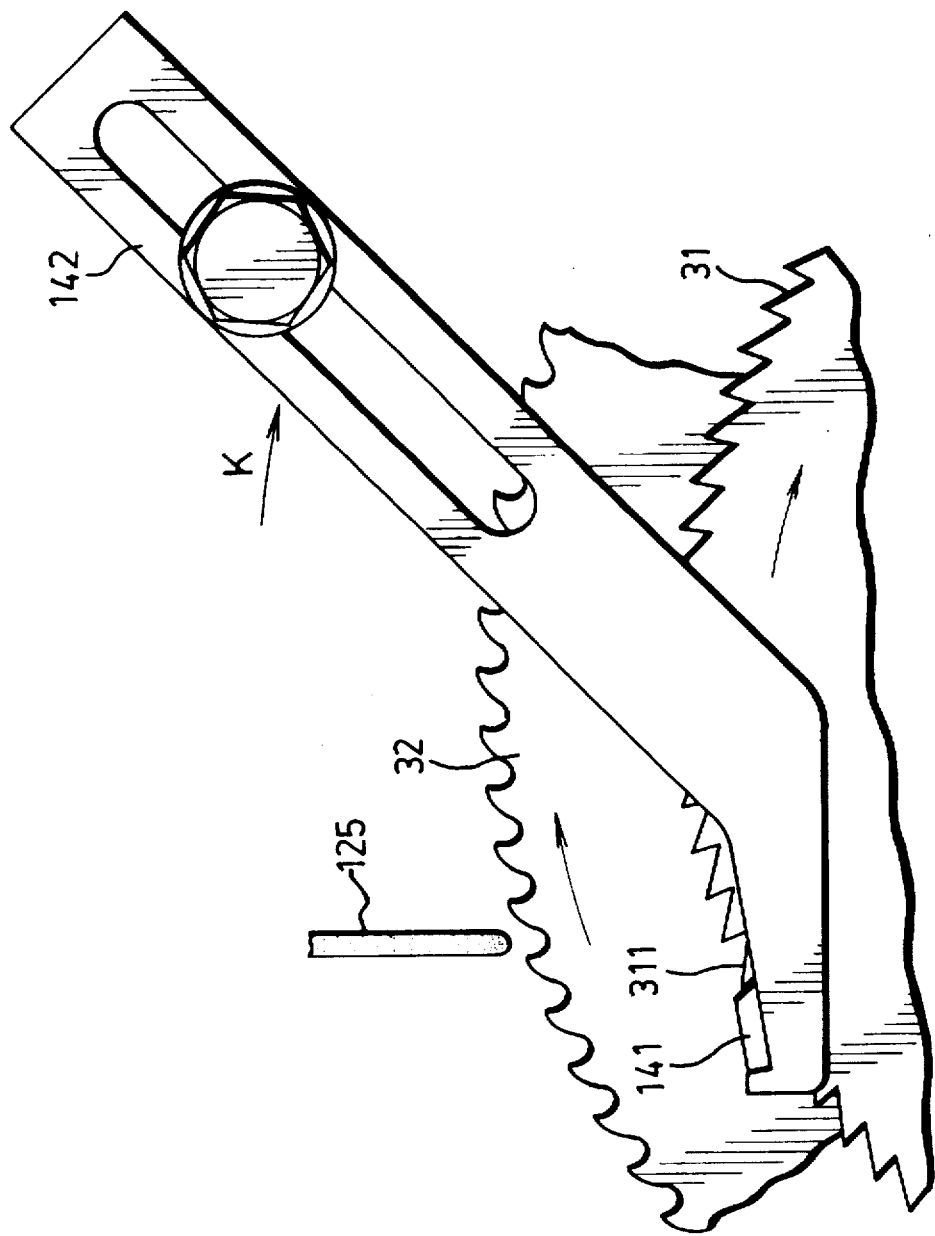
FIG. 8 shows a pull arm and a pawl member to actuate the ratchet wheel.

Referring to FIG. 8 in combination with FIG. 3, the rocking arm 14 is shown to couple a pull arm 142 which has a tungsten carbide pawl 141 soldered to the forwardly extending end thereof and which forms an angle with the rocking arm 14. The pawl 141 projects from the forwardly extending end of pull arm 142 for engagement with each ratchet tooth 311 of the indexing ratchet wheel 31. The direction of each inclining ratchet tooth is arranged to be counterclockwise. Since the pull arm 142 has the backward projecting pawl 141, each ratchet tooth can be pulled clockwise when the rocking arm 14 as well as the pull arm 142 moves backward.

In particular, when the rocking arm 14 is moved backward (as shown by arrow J) to a distance by the actuation of the cam 13, the pull arm 142 moves backward in a direction shown by arrow K (FIG. 8) and the ratchet tooth 311 is turned clockwise by a distance equal to one pitch of the ratchet teeth 311. With a subsequent forward movement of the rocking arm 14, the pawl 141 is moved forward to another adjacent ratchet tooth to start the next pulling operation.

Figure 9A:
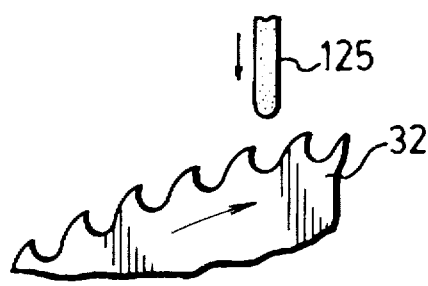
FIGS. 9A–9E show the operations of the grinding wheel and the saw tooth wherein the saw blade is indexing with the ratchet wheel which is driven by the pull arm.
Figure 9B:
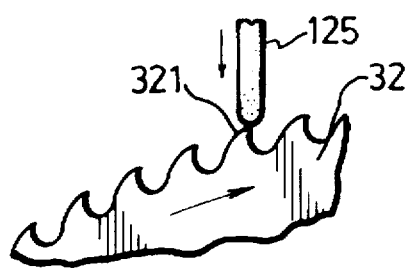
Figure 9C:
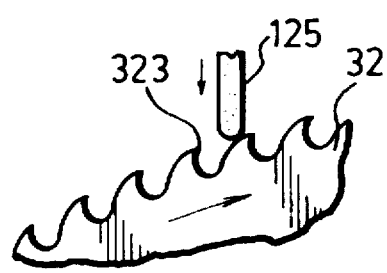
Figure 9D:
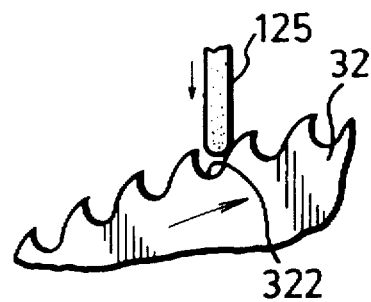
Figure 9E:
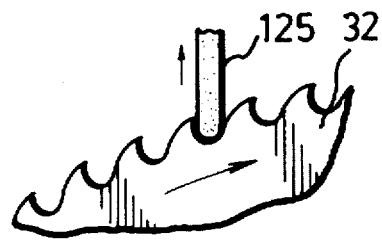

As shown in FIGS. 9A to 9E, when the grinding wheel 125 is moved forward or toward a saw tooth, it first contacts the land 321 of the saw tooth (FIG. 9B) and then moves towards the root 322 as shown in FIGS. 9C and 9D as the saw teeth moves clockwise. After the grinding wheel 125 reaches the root 322 (FIG. 9E), it grinds the cutting edge 323 and the root 322. Note that during the forward moving mode of the grinding wheel, the land 321 of each saw tooth starts to contact the grinding wheel, unlike the conventional apparatus in which a cutting edge starts to contact the forward end of the forward moving grinding wheel.

According to the present invention, the cams 11 and 13 are designed and arranged in such a manner that, when the rocking arm 14 moves to its backmost position, it stops temporarily for a short time before its forward movement, thereby idling the saw blade. The saw blade starts to stop as soon as the rocking arm 14 reaches its backmost position and is kept still until the rocking arm 14 starts its next backward movement after its idling forward movement. The grinding wheel is at its last few thousandth of an inch of its forward stoke and is about to reach its frontmost position when the rocking arm 14 starts to stop temporarily at its backmost position. At this instant, the grinding wheel starts to grind the root 322 and the cutting edge 323. Since the grinding wheel usually does not effect grinding during its backward movement, the cutting edge 323 is subject to grinding only during the last few thousandth of an inch of the forward stroke of the grinding wheel, thus eliminating the problem of overheating which is encountered with the conventional apparatus in which the cutting edge is ground during the full stroke forward movement of the grinding wheel. The grinding is finished when the grinding wheel reaches its frontmost position and starts to move backward. Since the rocking arm does not start its backward movement during this period, the cutting edge is still stationary when the grinding wheel moves backward and leaves the cutting edge, thereby alleviating the risk of inducing excessive pressure which would damage the cutting edge and the grinding wheel. The grinding wheel is arranged to move backward as the rocking arm and the pull pawl move forward and idle the saw blade. The outward moving grinding wheel from the cutting edge is also advantageous for eliminating possible impacts between the cutting edge and the grinding wheel. The subsequent movement of the saw blade starts after the grinding wheel 125 departs from the saw blade and is ready for the next forward movement.

With the invention thus explained, it is apparent that various modifications and variations can be made without departing from the spirit of the present invention. It is intended that the present invention be limited only as indicated in the appending claims.

What I claim is:

1. An apparatus for sharpening the teeth of a circular saw, each tooth having a cutting edge, a root and a land, the apparatus including a machine body, a grinding wheel which is movably and adjustably mounted on the machine body by a mechanism for forward movement of the grinding wheel to contact each saw tooth and backward movement to depart from each saw tooth in relative alignment, a saw blade support to hold coaxially an indexing ratchet wheel with the circular for synchronous rotation so that the indexing ratchet wheel moves and indexes each saw tooth relative to the grinding wheel, first means for moving and controlling the grinding wheel, and second means for moving and controlling the indexing ratchet wheel, the grinding wheel having two opposing flat grinding faces and a circumferential grinding face formed between the flat grinding faces, wherein:

the second means comprises means for moving each ratchet tooth in one angular direction that causes the land of each saw tooth to first contact the grinding wheel prior to contacting the root and the cutting edge with the grinding wheel when the grinding wheel moves forward and that leads the cutting edge of each saw tooth to move to contact one of the flat grinding faces of the grinding wheel when the grinding wheel is about to reach a frontmost position in which the grinding wheel reaches the root.

2. An apparatus for sharpening the teeth of a circular saw, each saw tooth having a cutting edge, a root and a land, the apparatus including a machine body, a grinding wheel which is movably and adjustably mounted on the machine body by a mechanism for forward movement of the grinding wheel to contact each saw tooth and backward movement to depart from each saw tooth in relative alignment, a saw blade support to hold coaxially an indexing ratchet wheel with the circular saw for synchronous rotation so that the indexing ratchet wheel moves and indexes each saw tooth relative to the grinding wheel, first means for moving and controlling the grinding wheel, and second means for moving and controlling the indexing ratchet wheel, wherein:

the second means comprising a cam mechanism, a rocking arm actuated by the cam mechanism, and a pull arm connected to the rocking arm for moving forward and backward so as to turn the ratchet teeth of the indexing ratchet wheel as well as the saw teeth of the circular saw, the cam mechanism controlling the rocking arm and the pull arm so as to move the circular saw to start contacting the grinding wheel with the land of each saw tooth thereof when the grinding wheel moves forward and to temporarily stop the circular saw when the grinding wheel contacts the cutting edge and the root of each saw tooth thereof until the grinding wheel leaves the circular saw.

3. An apparatus as claimed in claim 2, wherein the pull arm has a pawl projecting therefrom to pull each ratchet tooth.

4. An apparatus as claimed in claim 2, wherein the cam mechanism controls the rocking arm and the pull arm to cause the cutting edge of each saw tooth of the circular saw to contact the grinding wheel when the grinding wheel is about to reach a frontmost position in which the grinding wheel reaches the root, whereby the cutting edge is subject to grinding during the last thousandth of an inch of the forward stroke of the grinding wheel.

* * * * *